US011150876B2

(12) United States Patent
Wang

(10) Patent No.: US 11,150,876 B2
(45) Date of Patent: Oct. 19, 2021

(54) TRANSPARENT CLIENT-SIDE SOURCE CODE EDITING ON A REMOTE NETWORK MANAGEMENT PLATFORM

(71) Applicant: ServiceNow, Inc., Santa Clara, CA (US)

(72) Inventor: Yiwen Wang, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 50 days.

(21) Appl. No.: 16/243,916

(22) Filed: Jan. 9, 2019

(65) Prior Publication Data
US 2020/0218514 A1    Jul. 9, 2020

(51) Int. Cl.
| | | |
|---|---|---|
| *G06F 9/44* | (2018.01) | |
| *G06F 8/34* | (2018.01) | |
| *G06F 16/22* | (2019.01) | |
| *G06F 16/14* | (2019.01) | |
| *G06F 16/16* | (2019.01) | |
| *H04L 29/08* | (2006.01) | |

(52) U.S. Cl.
CPC .............. *G06F 8/34* (2013.01); *G06F 16/148* (2019.01); *G06F 16/168* (2019.01); *G06F 16/2246* (2019.01); *G06F 16/2282* (2019.01); *H04L 67/02* (2013.01)

(58) Field of Classification Search
None
See application file for complete search history.

(56) References Cited

U.S. PATENT DOCUMENTS

| | | | |
|---|---|---|---|
| 6,321,229 B1 | 11/2001 | Goldman | |
| 6,678,887 B1 | 1/2004 | Hallman | |
| 7,020,706 B2 | 3/2006 | Cates | |
| 7,359,990 B2 * | 4/2008 | Munir | G06F 8/33 709/245 |
| 7,716,353 B2 | 5/2010 | Golovinsky | |
| 7,769,718 B2 | 8/2010 | Murley | |
| 7,925,981 B2 | 4/2011 | Pourheidari | |
| 8,151,261 B2 | 4/2012 | Sirota | |
| 8,402,127 B2 | 3/2013 | Solin | |

(Continued)

OTHER PUBLICATIONS

Wikipedia, Visual Studio Code, downloaded from https://en.wikipedia.org/wiki/Visual_Studio_Code, Dec. 17, 2018.

(Continued)

*Primary Examiner* — Wei Y Zhen
*Assistant Examiner* — Lanny N Ung
(74) *Attorney, Agent, or Firm* — Fletcher Yoder PC

(57) ABSTRACT

A computing system stores source code files in a hierarchy of database tables. A plugin, executable within a source code editor, is configured to: receive, by way of uniform resource locators (URLs) related to the computational instance, table names of the database tables, and file names of the source code files; cause the editor to display, on a first pane of a graphical user interface (GUI), a menu of the table and file names; receive a selection of a file name; receive, by way of a URL, a source code file with the file name; cause the editor to display, on a second pane of the GUI, an editable representation of the source code file; receive a command to store the source code file (which was modified by way of the second pane); and transmit, by way of the URL, the source code file as modified.

20 Claims, 14 Drawing Sheets

(56) References Cited

U.S. PATENT DOCUMENTS

| | | | |
|---|---|---|---|
| 8,612,408 B2 | 12/2013 | Trinon | |
| 8,646,093 B2 | 2/2014 | Myers | |
| 8,832,652 B2 | 9/2014 | Mueller | |
| 9,065,783 B2 | 6/2015 | Ding | |
| 9,098,322 B2 | 8/2015 | Apte | |
| 9,122,552 B2 | 9/2015 | Whitney | |
| 9,317,327 B2 | 4/2016 | Apte | |
| 9,363,252 B2 | 6/2016 | Mueller | |
| 9,430,194 B1* | 8/2016 | Childs | G06F 8/33 |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,766,935 B2 | 9/2017 | Kelkar | |
| 9,805,322 B2 | 10/2017 | Kelkar | |
| 2002/0112078 A1* | 8/2002 | Yach | G06F 16/9577 709/246 |
| 2004/0003371 A1* | 1/2004 | Coulthard | G06F 8/24 717/101 |
| 2011/0270876 A1* | 11/2011 | Gill | G06F 16/33 707/769 |
| 2016/0077831 A1* | 3/2016 | Mihalcea | H01L 29/0619 717/131 |
| 2017/0272309 A1* | 9/2017 | Ichihashi | H04L 41/0686 |

OTHER PUBLICATIONS

Microsoft, Working with folders and files with REST, Apr. 18, 2018.
Microsoft, Extending Visual Studio Code, downloaded from https://code.visualstudio.com/docs/extensions/overview, Oct. 31, 2018.
Editing files in your Linux Virtual Machine made a lot easier with Remote VSCode, downloaded from https://medium.com/@prtdomingo/editing-files-in-your-linux-virtual-machine-made-a-lot-easier-with-remote-vscode-6bb98d0639a4, Oct. 31, 2018.
ServiceNow Documentation—Table API, downloaded from https://docs.servicenow.com, Oct. 31, 2018.
ServiceNow Sync, downloaded from https://marketplace.visualstudio.com/items?itemName=anerrantprogrammer.servicenow-sync, Oct. 30, 2018.

* cited by examiner

FIG. 6C

TRANSPARENT CLIENT-SIDE SOURCE CODE EDITING ON A REMOTE NETWORK MANAGEMENT PLATFORM

BACKGROUND

Software development on a remote network management platform (or any other remotely-hosted or cloud-based platform) can be challenging. Typically, a developer writes and edits source code files on his or her local computing device in a source code editor of choice, and then uploads these files to the platform for testing or deployment. But this requires that the developer make appropriate efforts to coordinate transmission and storage of various versions of the files between the local computing device and the platform. This can be a painstaking and error-prone process for projects with a large number of files.

Alternatively, some platforms provide web-based source code editing facilities. But these web-based editors are often limited in scope, and might not support automatic syntax highlighting, automatic formatting, intelligent code completion, and possibly other features as well. In some cases, a web-based editor may be no more than a simple dialog box on a web page.

SUMMARY

In order to provide a rich visual editing experience for software developers working with source code files stored on a remote platform (e.g., a computational instance of a remote network management platform or a server device), the embodiments herein facilitate transparent access to these remote files from a locally-executing source code editor. In particular, such a source code editor may execute on the developer's local client device and provide automatic syntax highlighting, automatic formatting, intelligent code completion, etc. on a graphical user interface. The source code editor may also be extensible by way of one or more plugins.

A plugin is described herein that allows a developer to specify an address of a remote platform that stores source code files in database tables arranged in a tree-like hierarchy. By way of representational state transfer (REST) transactions, the plugin may obtain the names of the files and tables, and arrange these in a menu according to the hierarchy. For instance, each first-level entry in the menu may relate to a table name, and second-level entries within the first-level entries may be related to file names in the respective tables.

When the developer clicks on or otherwise selects a file name in the menu, the plugin may retrieve the associated file from the remote platform. This retrieval may also take the form of a REST transaction. Once the file is retrieved to a local copy, the source code editor may display it and apply any of the applicable displaying and editing features thereto. The developer may modify the file and then save it back to the remote platform. Again, the plugin may facilitate the save operation by way of a REST transaction with the remote platform. This transaction stores the file as modified back to the appropriate entry of the appropriate database table.

In this way, a developer can take advantage of the features of the source code editor when viewing and editing a remotely-stored file. The remote access may be transparent to the developer, in that the developer's interactions with the source code editor may be similar to those involved in the editing of local files.

Accordingly, a first example embodiment may involve a computational instance disposed within a remote network management platform, where the computational instance stores a plurality of source code files in a hierarchy of database tables. The first example embodiment may also involve a plugin, executable within an extensible source code editor of a client device, wherein the plugin is configured to: (i) obtain an address of the computational instance; (ii) request and receive, by way of one or more uniform resource locators (URLs) related to the address of the computational instance, table names of the database tables, file names of the source code files, and a representation of the hierarchy; (iii) cause the extensible source code editor to display, on a first pane of a graphical user interface of the client device, a menu of the table names and the file names, where the menu is navigable according to the hierarchy; (iv) receive, by way of the graphical user interface, a selection of a particular file name from the file names; (v) in response to receiving the selection, request and receive, by way of a URL referencing an entry in the hierarchy of database tables, a copy of a particular source code file with the particular file name, where the particular file name is stored in the entry; (vi) cause the extensible source code editor to display, on a second pane of the graphical user interface, an editable representation of the copy of the particular source code file; (vii) receive, by way of the graphical user interface, a command to store the particular source code file on the computational instance, where the particular source code file was modified by way of the second pane of the graphical user interface; and (viii) in response to receiving the command, transmit, by way of the URL referencing the entry, the copy of the particular source code file as modified.

A second example embodiment may involve obtaining, by a plugin of an extensible source code editor executing on a client device, an address of a computational instance disposed within a remote network management platform, where the computational instance stores a plurality of source code files in a hierarchy of database tables. The second example embodiment may also involve requesting and receiving, by the plugin and by way of one or more URLs related to the address of the computational instance, table names of the database tables, file names of the source code files, and a representation of the hierarchy. The second example embodiment may also involve causing, by the plugin, the extensible source code editor to display, on a first pane of a graphical user interface of the client device, a menu of the table names and the file names, where the menu is navigable according to the hierarchy. The second example embodiment may also involve receiving, by the plugin and by way of the graphical user interface, a selection of a particular file name from the file names. The second example embodiment may also involve, in response to receiving the selection, requesting and receiving, by the plugin and by way of a URL referencing an entry in the hierarchy of database tables, a copy of a particular source code file with the particular file name, where the particular file name is stored in the entry. The second example embodiment may also involve causing, by the plugin, the extensible source code editor to display, on a second pane of the graphical user interface, an editable representation of the copy of the particular source code file. The second example embodiment may also involve receiving, by the plugin and by way of the graphical user interface, a command to store the particular source code file on the computational instance, where the particular source code file was modified by way of the second pane of the graphical user interface. The second example embodiment may also involve, in response to receiving the command, transmitting, by the plugin and by way of the URL referencing the entry, the copy of the particular source code file as modified.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6C illustrates an extensible IDE with access to remote files, in accordance with example embodiments.

DETAILED DESCRIPTION

Figure 1:
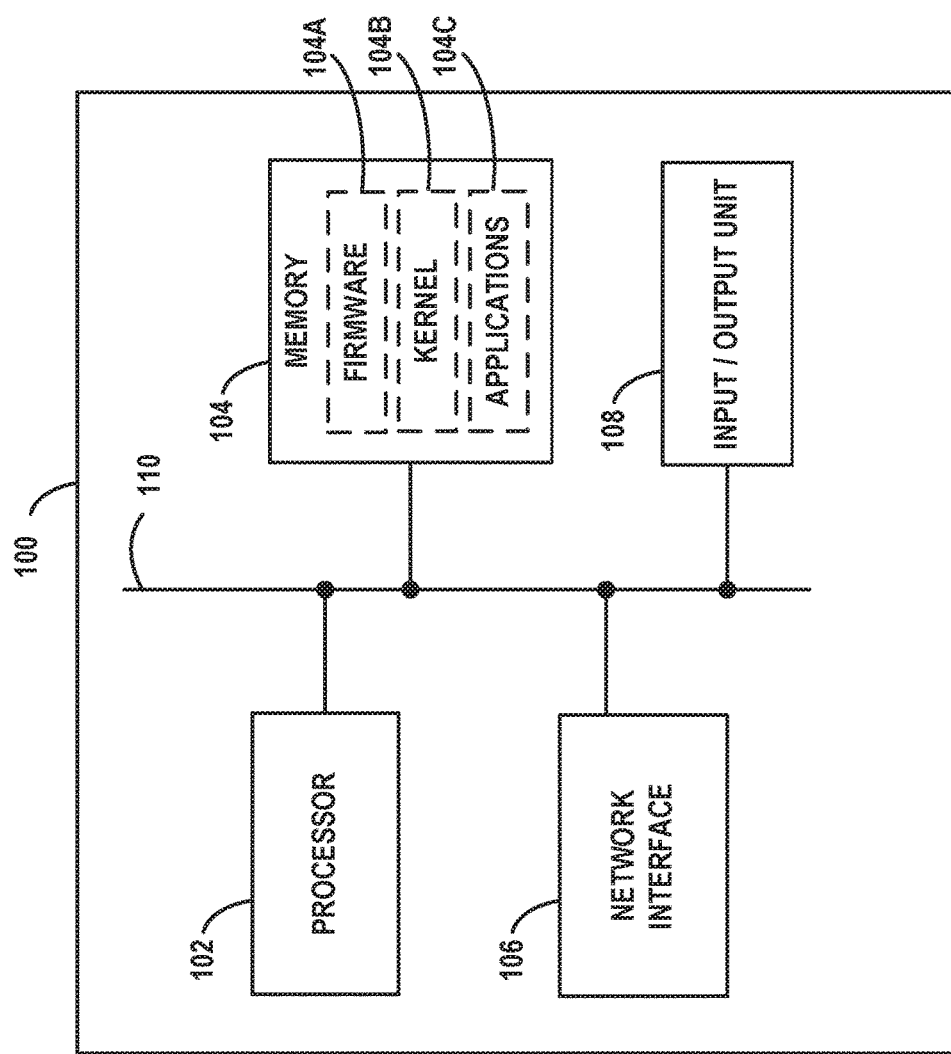
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
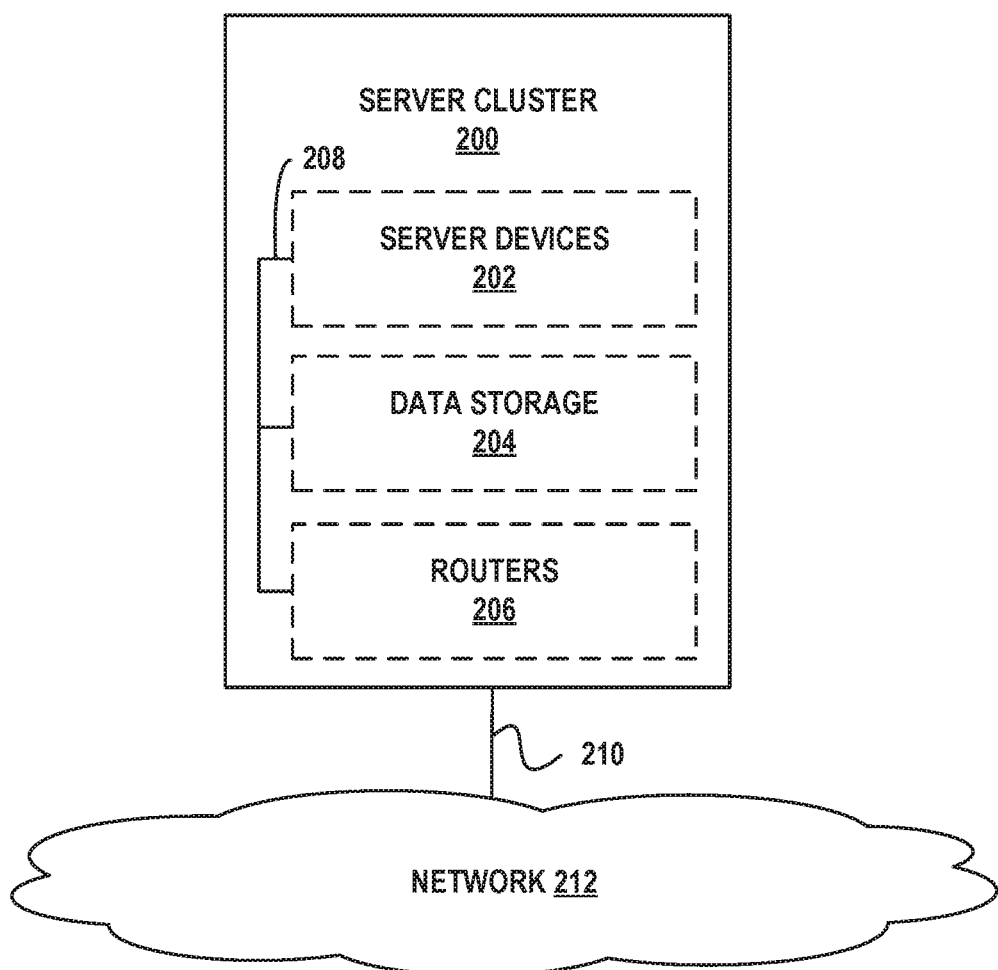
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML/HTML5), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
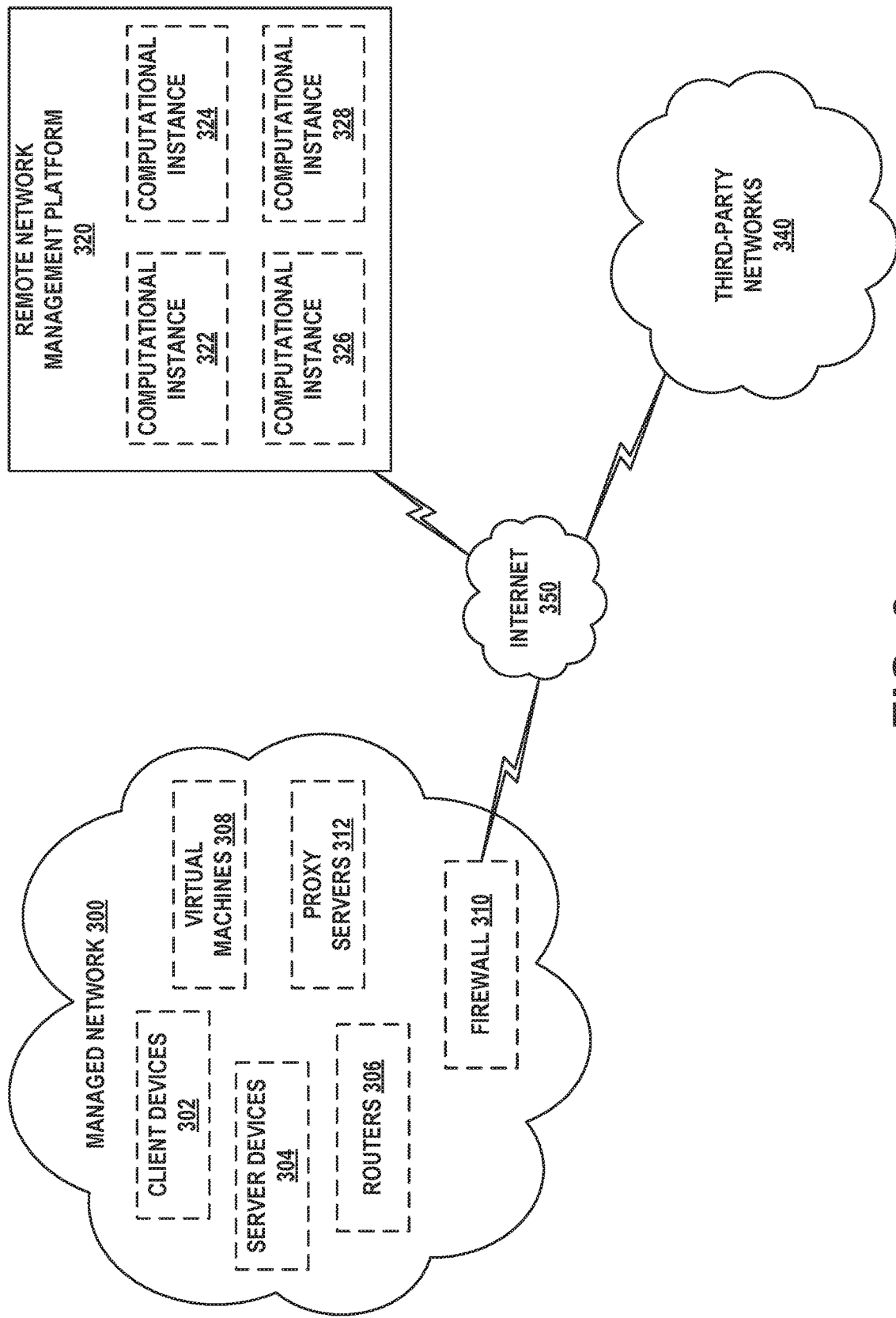
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
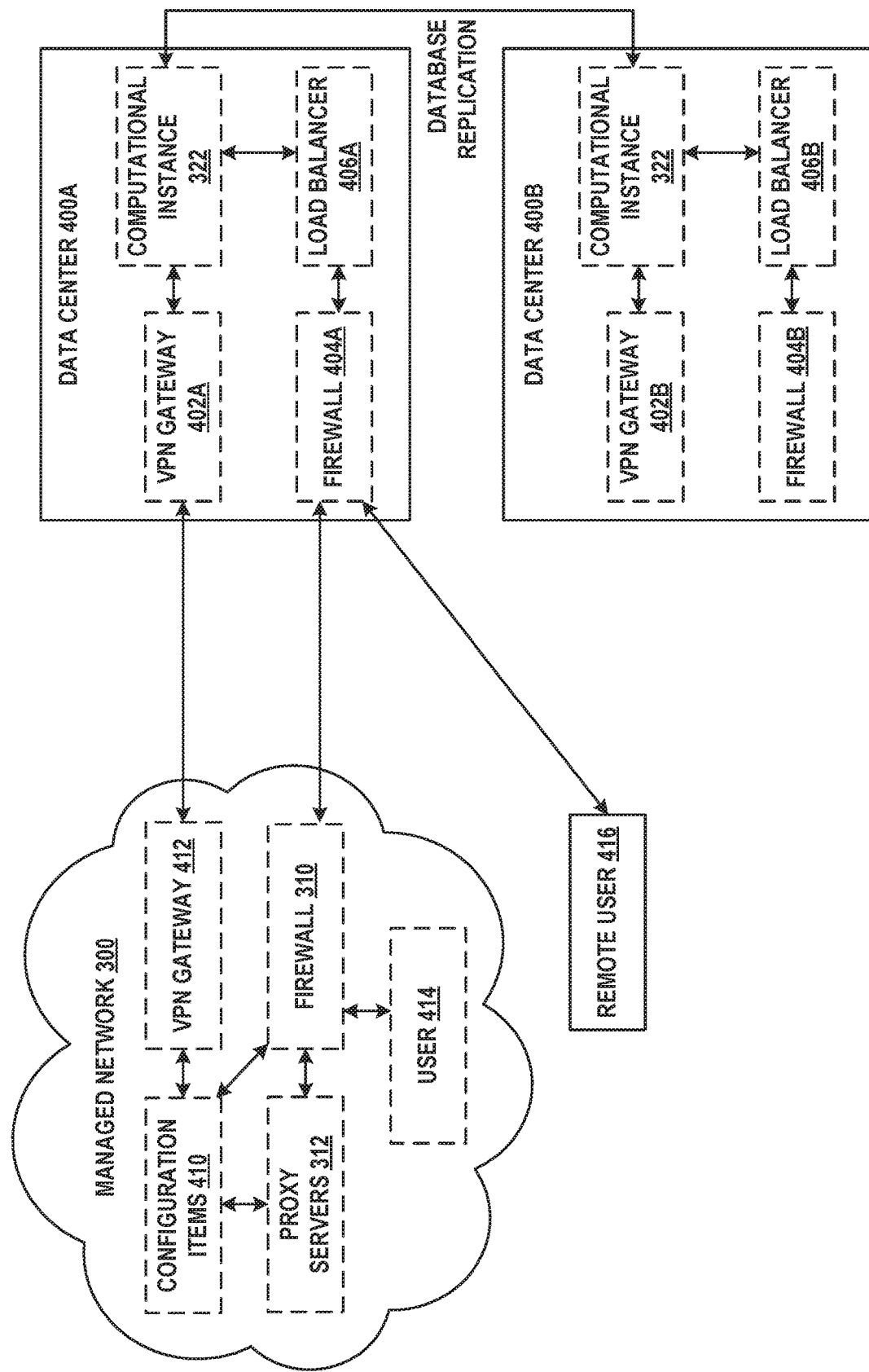
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
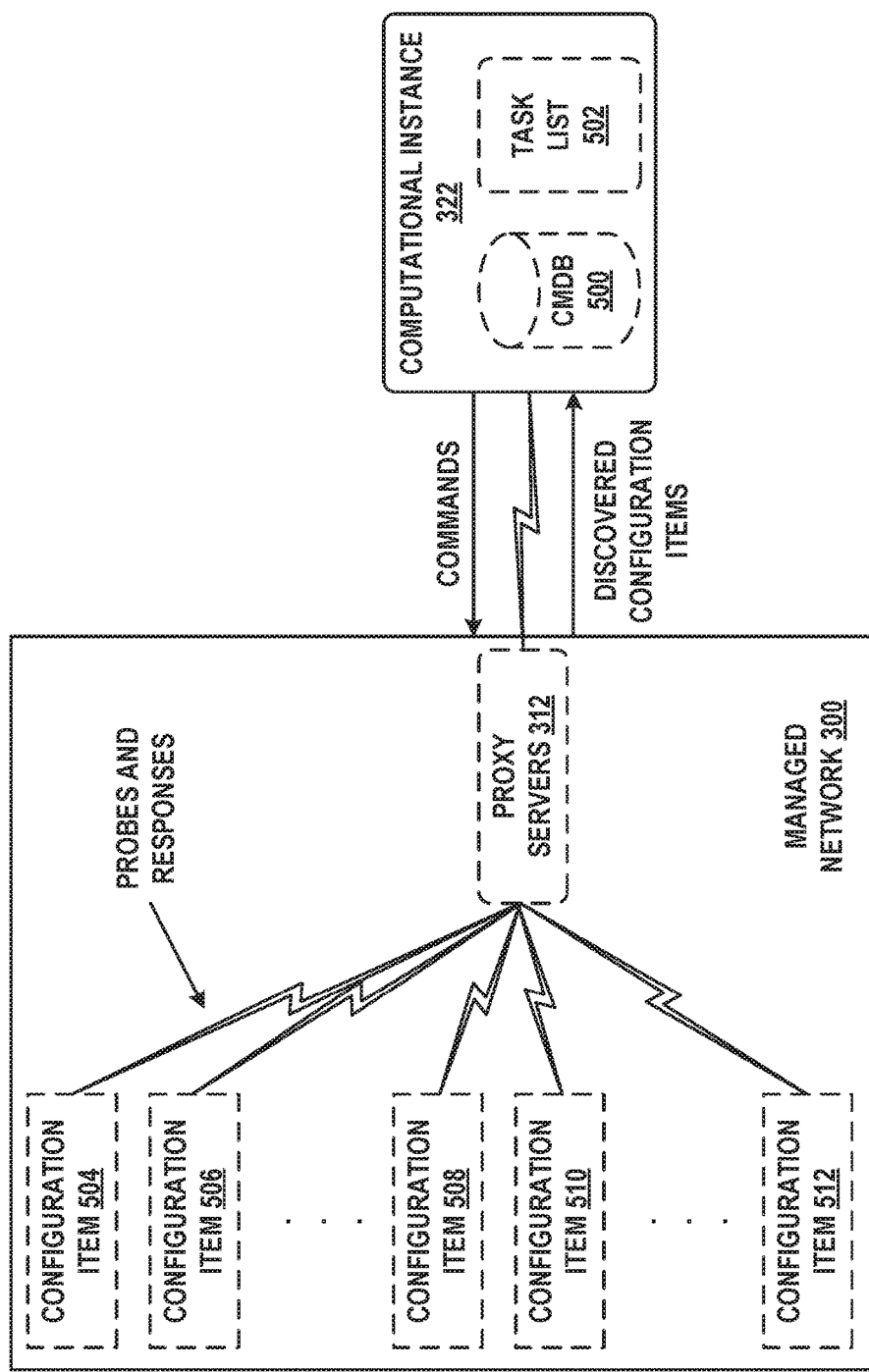
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
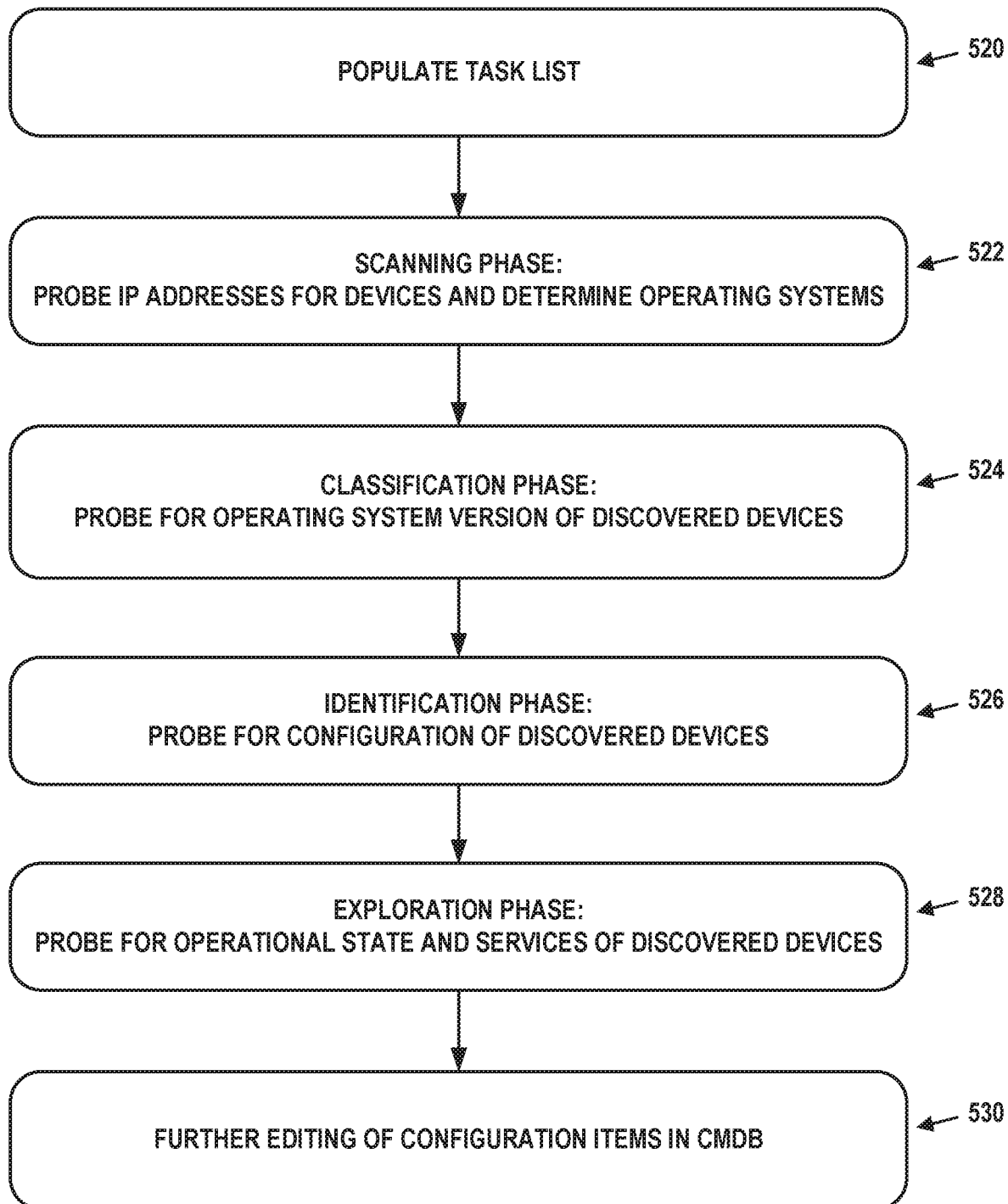
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example IDE Variations

It is common for developers to edit scripts or other forms of source code stored on web servers (e.g., of a computational instance). To do so, developers may use simplistic text editors accessible through a web browser to make changes to files stored on the web servers. Such a text editor provides access to the properties and contents of a file through a portal-like web page, where changes to the file may be stored in a database local to the web server. A web-based text editor may generally be referred to as a "web-based integrated development environment" or "web-based IDE."

Such a web-based IDE may include only simplistic features, unlike those found in a more powerful and mature native IDE that operates on client devices. By using a web-based IDE, developers cannot take advantage of the rich, built-in support for software development found in a native IDE. For example, a native IDE may provide productivity features such as syntax highlighting, bracket-matching, auto-indentation, box-selection, collapsible code, and more. Some native IDEs may also support code completion, rich semantic code navigation, and even code refactoring.

Native IDEs also provide the capability to optionally install plugins. Some native IDEs may refer to plugins as "extensions." This extensibility allows an IDE to be customized with third-party software to simplify or streamline certain processes, making software development easier and more efficient. Some native IDEs, for example, provide the ability to install customizable extensions to improve user experience, such as computing code complexity of certain files, customizing an automated refactoring tool, colorizing bracket pairs, and even collaboration tools.

Native IDEs can also provide a developer with a hierarchical representation of local directories and files. The representation may be contained within its own pane of the IDE while the file(s) being edited are displayed in a different pane. This directory pane allows users to quickly access relevant files and provides a high-level understanding of the relationships between files and directories.

These extensibility features, in addition to the high-level directory access and the other powerful functions found in most native IDEs, provide developers with a customizable and robust environment to develop software. As such, using web-based IDEs fails to provide an environment in which developers can be efficient.

The embodiments herein provide mechanisms through which a native IDE can remotely access files stored on a remote computing device. But first, as a point of reference, web-based IDEs are discussed.

A. Example Web-Based IDE

Figure 6A:
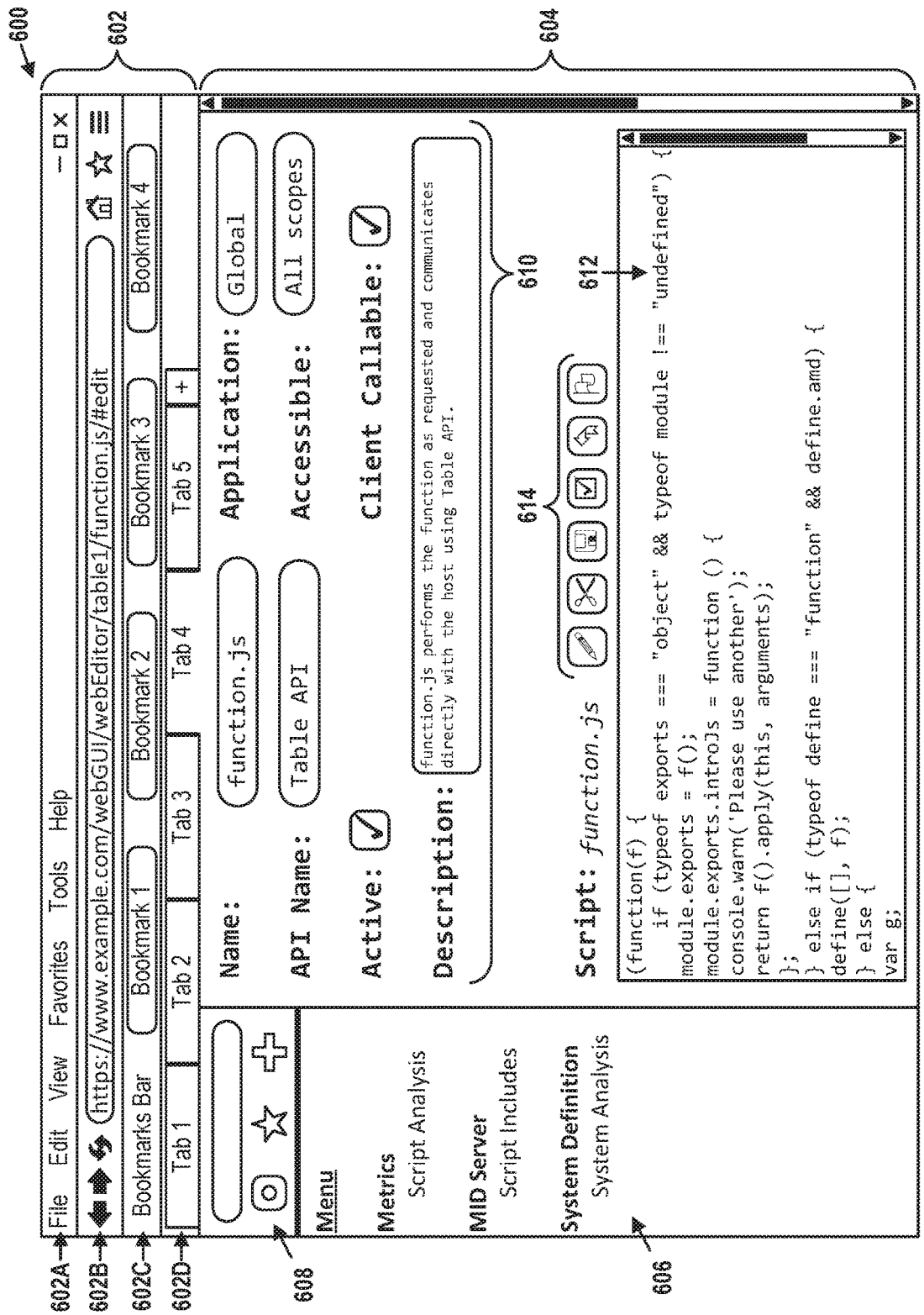
FIG. 6A illustrates a script editor accessible via a web browser, in accordance with example embodiments.

FIG. 6A depicts a web-based IDE used to access remote server devices and provide source code editing functionalities thereto. In FIG. 6A, a web browser 600 may include web browser tools 602. Web browser tools 602 can include interactive GUI elements displayed within a web browser to provide web browser functionality and improve the usability of a web browser. For example, web browser tools 602 may include a web browser menu 602A, a URL toolbar 602B, a bookmarks bar 602C, and a tabs bar 602D. Web browser tools 602 may also take up a large portion of screen real estate as shown in FIG. 6A, yet fail to provide any enhanced IDE functionality.

Web browser 600 may be used to display a web page, such as web editor page 604 as shown in FIG. 6A. Web editor page 604 may contain elements related to website functionality, account settings, device management, browser features, or any other feature that may or may not be related to software development or file modification. For example, FIG. 6A illustrates a side menu 606, not unlike other website menus, to provide convenient shortcuts or features that contribute to the functionality of a website as a whole, not the web editor page or web-based IDE.

FIG. 6A further illustrates website navigation tools 608, also found on many websites to provide an end user with navigational buttons, generally uniform across the entire website. Navigation tools 608 may be used to access other pages of the website, search the site's contents, or simply just provide a reliable "home page" button.

Web editor page 604 may also include at least one or more property tools 610 that may be used to modify the properties of a currently open file by way of web editor page 604. Property tools 610 may include a wide variety of interactive web page elements, such as GUI buttons and form/text objects used to modify the properties of an open file. In FIG. 6A, for example, web editor page 604 may display property tools 610 that are text-oriented, such as text boxes entitled "API Name" and "Description." Web editor page 604 may also include other interactive elements, such radio buttons entitled "Active" and "Client Callable."

Web editor page 604 may also include a text editor 612, which displays the contents of the file. Text editor 612 may provide text editing capabilities. Text editor 612 may include a limited number of editing features, such as "edit," "cut," "save," etc. as shown in text editor tools 614. In order to compensate for the limited space provided by the web editor page 604, text editor tools 614 may be directed toward limited functionality and a small number of features. Limiting text editor tools 614 reduces the number of text processing functions available to the user.

Web editor page 604 is constrained by both the capabilities of an HTML web page and the properties of the browser displaying the page. In FIG. 6A, web editor page 604 is limited to the size allowed by the extraneous web browser tools 602. Furthermore, web browser shortcuts and interpretations of keystrokes may differ from the interpretations of native applications, such as a native IDE. For example, a web browser may interpret particular keystrokes (e.g., CTRL+Tab) as a certain web browser function (e.g., select next tab). In a native IDE, those same keystrokes may be interpreted as a function beneficial to software development (e.g., jump to next file).

B. Native IDE

In contrast to a web-based IDE, a native IDE operates locally on client devices and provides rich, built-in support for software development, as well as a wide-range of extensibility features to customize the user experience of the native IDE and the functionality thereof. Furthermore, as stated above, a native IDE is not constrained by a browser window. Instead, a native IDE may display features that are more practical for a development environment. The user can use the entirety of their display for features that they find most advantageous.

Figure 6B:
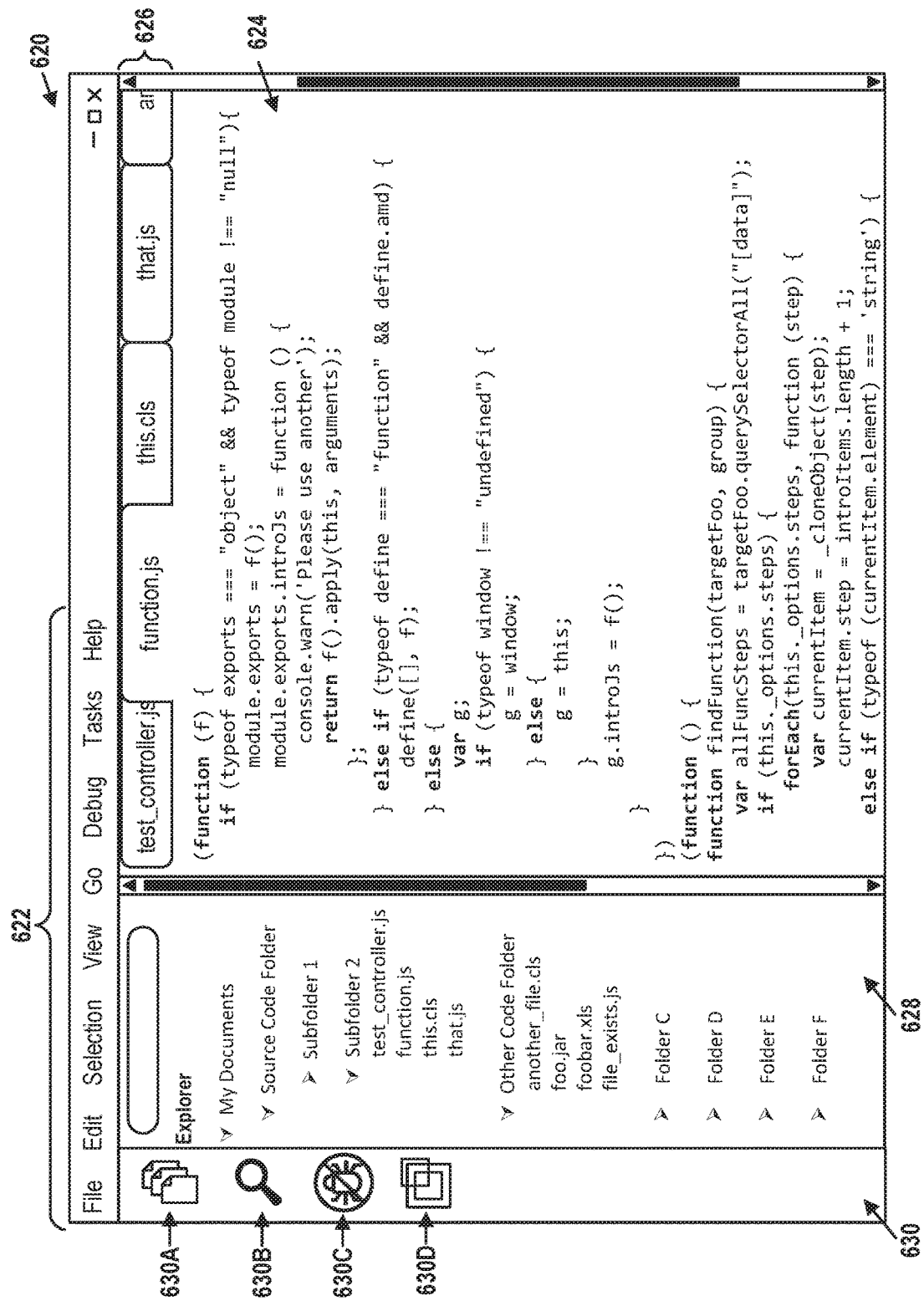
FIG. 6B illustrates an extensible integrated development environment (IDE), in accordance with example embodiments.

FIG. 6B depicts one example of a native IDE that works directly with directories and files stored locally on the client device. As stated previously, a native IDE may provide source code editing functionalities for modifying local files, as well as the extensibility features and other benefits of native IDEs as described above. In FIG. 6B, a native IDE 620 may include a native toolbar 622. Native toolbar 622 may include various commands and functionalities that native IDE 620 may perform.

Native toolbar 622 may provide functions similar to those provided by web browser toolbar 602A. However, native toolbar 622 may further provide additional functions more directly applicable to the capabilities of a native IDE. Rather than filling valuable screen real estate without providing IDE functionality like web browser toolbar 602A, native toolbar 622 may include toolbar menu items indicative of the functions capable of a native IDE. For example, native toolbar 622 may include toolbar menu items such as "Selection" and "Debug" as illustrated in FIG. 6B.

Native IDE 620 further includes various individual panes, such as text editing pane 624, as shown in FIG. 6B. Text editing pane 624 may be used to display the contents of at least one file opened by native IDE 620 and consequently provide text editing capabilities thereto. For example, text editing pane 624 displays the contents of a file entitled "function.js" as shown in FIG. 6B.

Native IDE 620 may further include GUI elements that represent the files actively open by native IDE 620. These GUI elements may be displayed as a list of virtual tabs, horizontally organized by recently opened, manually by a user, or some other categorical variable. Native IDE 620 may include open tabs 626 as shown above text editing pane 624 in FIG. 6B. Each of the open tabs 626 may represent the files presently open by native IDE 620. Open tabs 626 may display the names of each open file. Selecting one of the open tabs 626 via the GUI of the native IDE 620 can subsequently display the contents of the corresponding file in the text editing pane 624.

Another individual pane that may be included within native IDE 620 is directory explorer pane 628. Directory explorer pane 628 may be used to explore the directories and source code files stored on the client device. For example, directory explorer pane 628 may display a representation of directory names and file names hierarchically organized. The names of each directory and file may be selectable, producing different results within native IDE 620. For example, when a directory is selected, directory explorer pane 628 may display the contents (e.g., source code files, other directories, etc.) stored within that directory. However, if a file is selected from directory explorer pane 628, text editing pane 624 may display the contents of the file. Selecting a file from directory explorer pane 628 may further append a representation of the selected file to open tabs 626.

Native IDE 620 may further include yet another pane, depicted as functions pane 630 in FIG. 6B. Functions pane 630 may include interactive GUI elements, such as explorer button 630A, search button 630B, debug button 630C, and extensions button 630D as shown in FIG. 6B. The elements of functions pane 630 may be predetermined as a list of commonly used functions for native IDE 620. The elements of functions pane 630 may also be determined by other means, such as a user's custom preference or even dynamically organized by recently used or most popular.

C. Native IDE with Access to Remote Files by way of Plugin

Figure 6C:
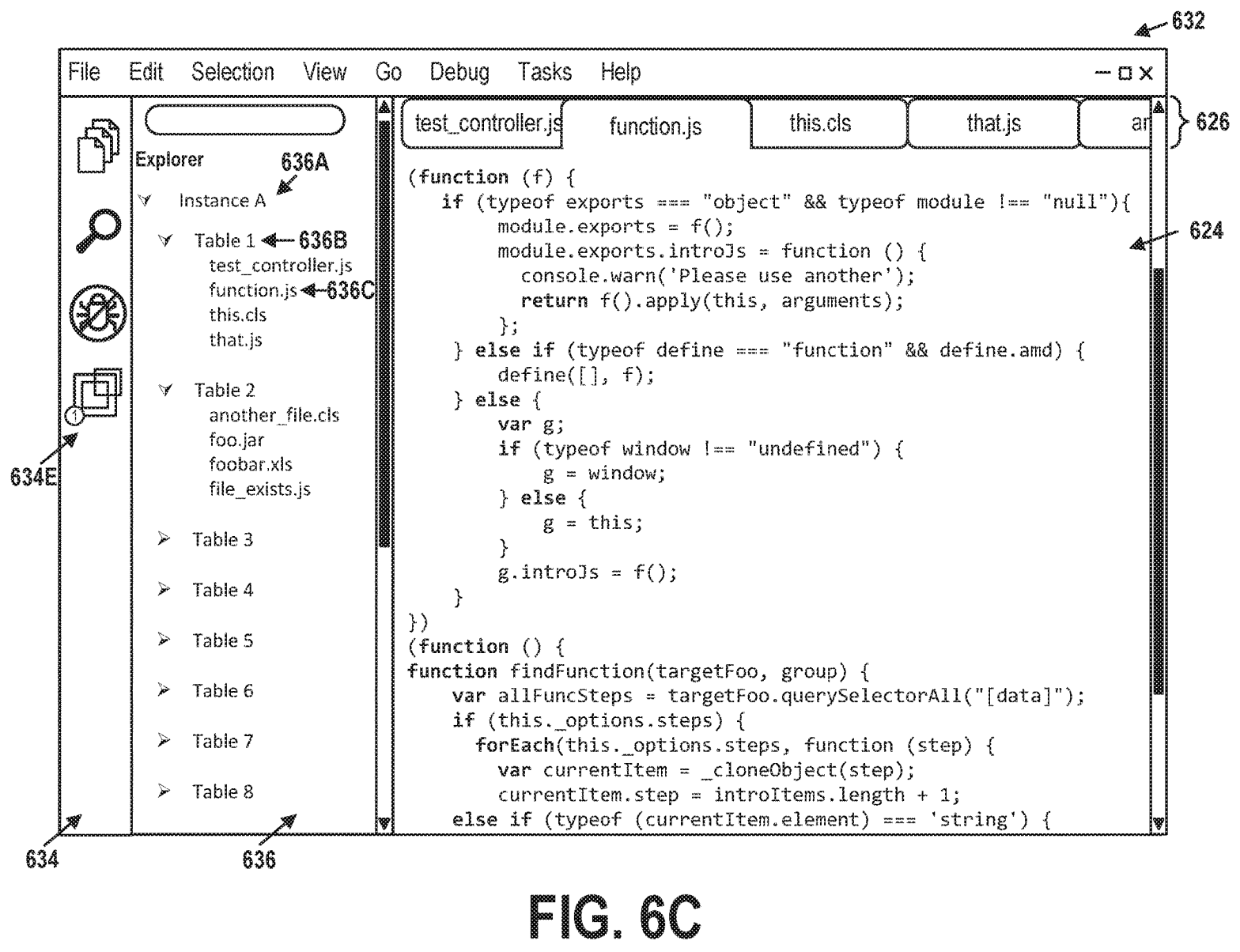

FIG. 6C depicts an example of a native IDE similar to that found in FIG. 6B. However, the plugin-activated native IDE 632 found in FIG. 6C allows a developer, by way of a plugin, to navigate database tables as a tree-like hierarchy and modify source code files stored therein. Plugin-activated native IDE 632 may include some panes as found in the previously mentioned native IDE 620, however it may further include unique panes as well, such as a modified functions pane 634 and database explorer pane 636.

Modified functions pane 634 may display different icons or alternative functions as defined by the plugin. Displaying modified functions pane 634 may be indicative that the plugin is currently installed. For example, modified functions pane 634 may display a modified extensions button 634E. Modified extensions button 634E may contain a small indicator that notifies the user that at least one or more plugins are installed. In FIG. 6C, modified extensions button 634E contains an indicator bubble, which indicates that one plugin is installed.

Plugin-activated native IDE 632 may further include another pane that allows the user to navigate a database in a hierarchical manner. In FIG. 6C, plugin-activated native IDE 632 may include database explorer pane 636. Database explorer 636 may be used to explore a database of a specified computational instance, including the data tables and files stored therein. For example, database explorer pane 636 may display a list of names representative of the databases, tables, and files stored therein. In FIG. 6C, database explorer pane 636 includes a database name 636A (e.g., "Instance A"), a table name 636B (e.g., "Table 1"), and/or a file name 636C (e.g., "function.js").

The list of names representative of databases, tables and/or files stored on computational instance 322 may be selectable within the database explorer pane 636 by way of a GUI. In some embodiments, selecting one of the representative names listed in the database explorer pane 636 may trigger the plugin to request the corresponding resource. In other words, selecting an item from the list of names in the database explorer pane 636 can trigger the plugin to submit, to a computational instance, a request for the data that corresponds to the selection's address. In some embodiments, when a database name 636A (e.g., "Instance A") is selected by the user, representative names of the tables and/or files contained therein may be displayed below database name 636A, as shown in FIG. 6C.

In some embodiments, this process of requesting and receiving may be repeated recursively, traveling down the data tables within the database of a computational instance. For example, when a user selects table name 636B (e.g., "Table 1"), a list of names for the files and/or tables stored therein may be displayed below the selected table name 636B, as will the files and/or tables further stored therein, and the cycle repeats. In other embodiments, the process of requesting and receiving may not necessarily be repeated recursively.

VI. Plugin URL Components and Remote Access Transactions

As stated previously, plugin-activated native IDE 632 may communicate with and further access remote platforms by way of its plugin using a URL related to the address of a particular computational instance. At least one URL may be provided to the plugin by way of the GUI of the user's device. The various embodiments herein are intended for illustrative purposes only and may not encompass all API calls or possible URLs.

Figure 7:
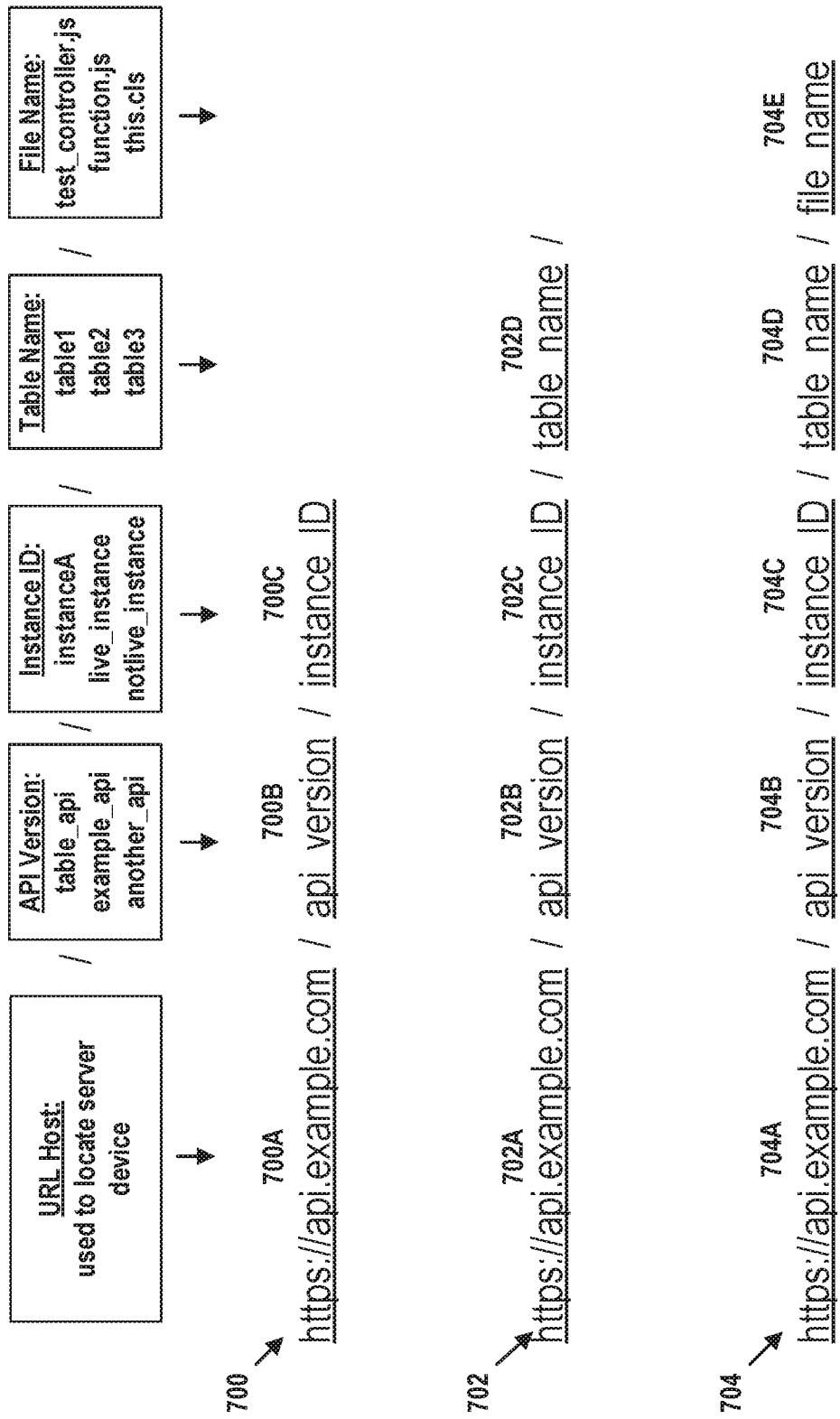
FIG. 7 illustrates URL components and matched application programming interface (API) functionalities, in accordance with example embodiments.

FIG. 7 illustrates a plurality of URL variations that may be used to facilitate communication and transactions between plugin-activated native IDEs (e.g., plugin-activated native IDE 632) and a computational instance. These URL variations may be addresses of respective REST interfaces that can be accessed and used by way of HTTP GET, HTTP PUT, and HTTP POST commands, for example.

To that point, instance URL 700 may include various URL path components, such as URL host 700A, API version 700B, and instance ID 700C. In some embodiments, instance URL 700 may be used to initiate communication between plugin-activated native IDEs and computational instances. In some embodiments, instance URL 700 may be used to access a computational instance and request data stored therein, such as table names of database tables. This URL may also provide access to file names of the files stored within these tables and/or a representation of the hierarchical structure that relates the tables and files.

FIG. 7 further illustrates another URL that may be used to access a specific data table and the file names stored therein. For example, table URL 702 may include similar URL path components as instance URL 700 (e.g., URL host 702A, API version 702B, and instance ID 702C), however, table URL 702 additionally includes table name 702D. Thus, table URL 702 may be used to access a computational instance and obtain names of files stored in the specified table.

FIG. 7 also illustrates yet another URL that may be used to access a specific file stored in one of these tables. For example, file URL 704 may include similar URL path components as table URL 702 (e.g., URL host 704A, API version 704B, instance ID 704C, and table name 704D), however, file URL 704 additionally includes file name 702E. Thus, file URL 704 may be used to access a computational instance and read or write the specified file.

The boxes at the top of FIG. 7 provide examples of the hosts, API versions, instance IDs, table names, and file names that could be formed using these URLs. For example, one possible URL is https://api.example.com/table_api/instanceA/table2/function.js.

Figure 8A:
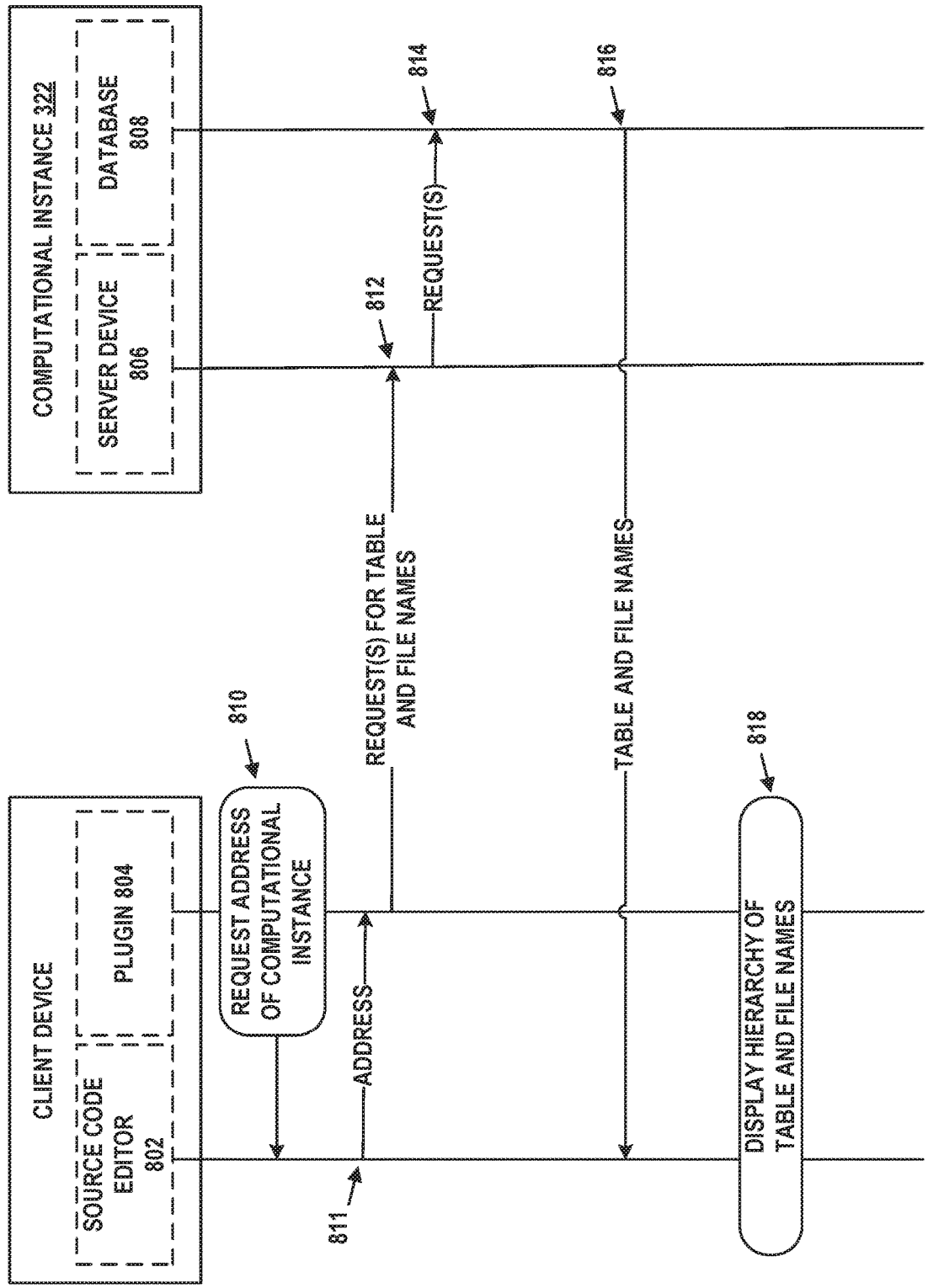
FIG. 8A depicts a message flow diagram, in accordance with example embodiments.

A series of events may take place in order to provide access to and display, within a source code editor such as plugin-activated native IDE 632, remote databases, tables, and/or files stored therein. For example, FIG. 8A displays a client device that includes source code editor 802 and plugin 804. In some embodiments, source code editor 802 may represent a native IDE, such as plugin-activated native IDE 632. When plugin 804 is activated, a request for the address of a computational instance may be displayed as shown at step 810 in FIG. 8A. The address may then be provided by way of the GUI of the source code editor 802 at step 811. This address may be the URL of a REST interface on the computational instance, and may be specified similarly to instance URL 700, for example.

Computational instance 322 may include a server device 806 and a database 808. After the address is provided to the computational instance 322 in response to the request 810, at least one request for table and file names may be generated and transmitted by way of a REST transaction. In some embodiments, the request(s) and responses thereto may be sent by way of other mechanisms that use HTTP, or other protocols. The request(s) may contain at least the address of the computational instance. This address may help direct the request(s) to the correct computational instance 322, as well as server device 806 thereof and database 808. For example, server device 806 may receive the request(s) as shown at step 812 in FIG. 8A.

After receiving the request(s), server device 806 may further transmit the request for table and file names from database 808 as shown at step 814. Database 808 may, in response to receiving the request at step 814, return a list of table names of the database tables, file names of the source code files stored therein, and a representation of the hierarchy thereof. Transmitting this information at step 816 may return the requested information to the client device and, ultimately, source code editor 802. Once information is retrieved, source code editor 802 may display the information according to the representation of the hierarchy as shown at step 818 in FIG. 8A.

In some embodiments, a single REST transaction at step 812 may result in multiple table names and file names, as well as an indication of their associated hierarchy, to be provided at step 816. In other embodiments, multiple REST transactions may be used. For example, a first REST transaction (formatted similarly to instance URL 700) may be used to obtain the names of the tables and then one REST transaction per table (each formatted similarly to table URL 702) may be used to obtain the file names of files stored in that table.

Figure 8B:
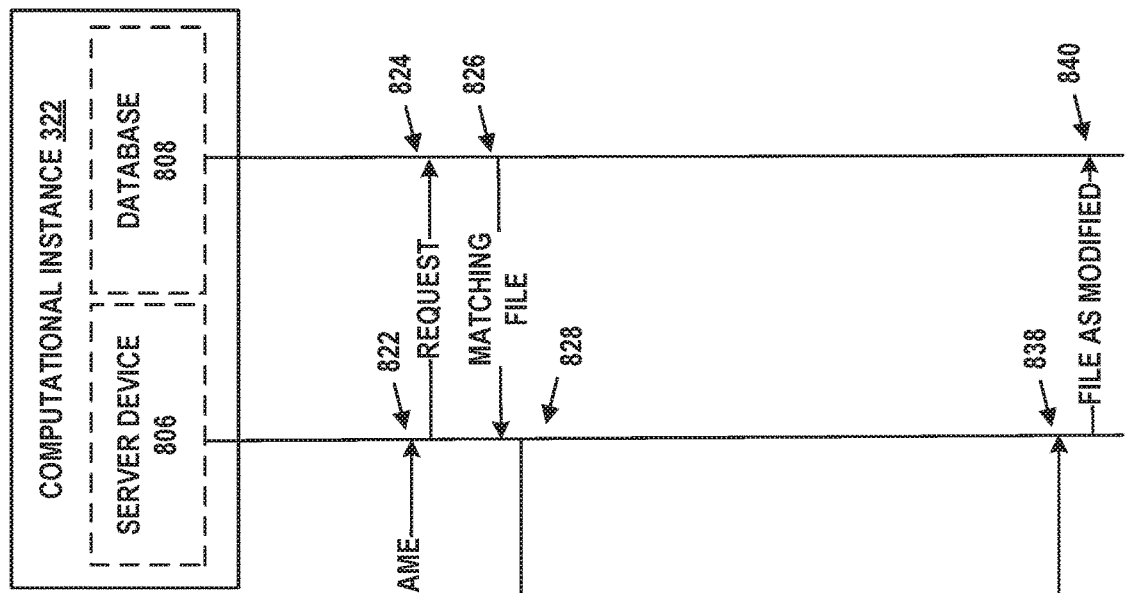
FIG. 8B depicts another message flow diagram, in accordance with example embodiments.
Figure 8B:
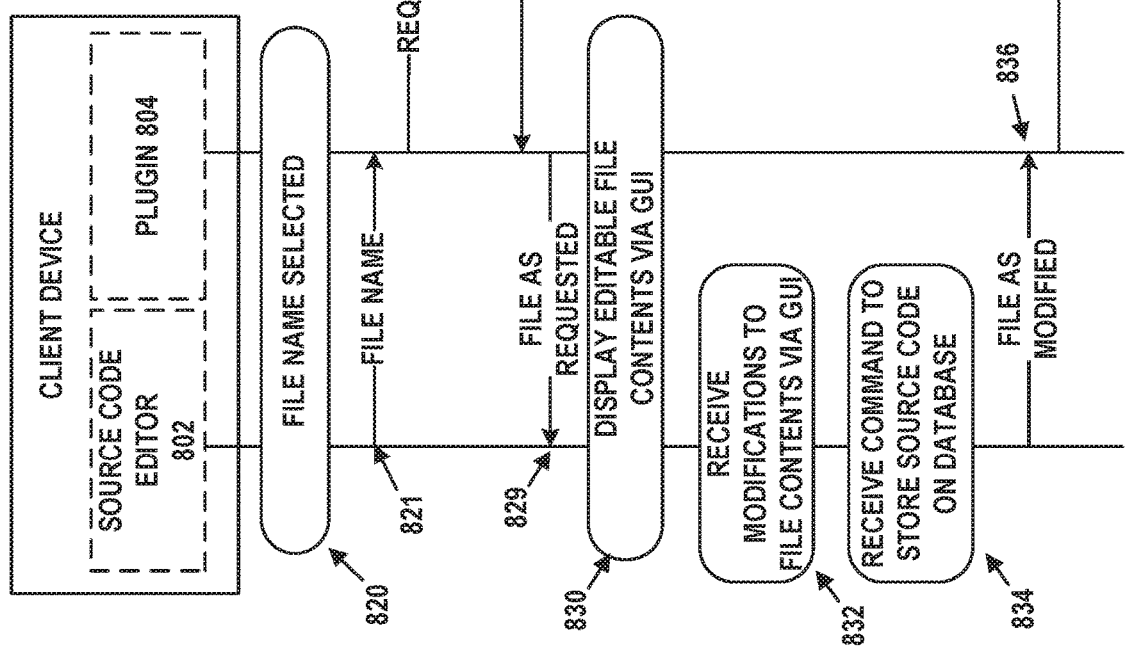

FIG. 8B depicts the process of requesting and receiving a selected file. The file name may be selected at step 820. The file name may then be provided to plugin 804 at step 821. Plugin 804 may receive the file name and generate, based on that file name, a request for a matching file. This request may also use a REST interface by way of a URL formatted similarly to file URL 704. Plugin 804 may transmit, at step 822, the request for a matching file to server device 806. After receiving the request for a matching file at step 822, server device 806 may request, from database 808, a file matching the selected file name as shown at step 824 of FIG. 8B. The request as transmitted at step 824 may include instructions to search database 808 in order to identify the matching file and return a copy of the file as requested.

In response to receiving the request at step 824, database 808 may return the result(s) of the search instructions, comprising a transmittable copy of the matching file as stored in the database as shown at step 826 of FIG. 8B. The transmittable matching file may then be further transmitted from the server device 806 to the plugin 804 as shown at step 828 of FIG. 8B. Source code editor 802 may receive the file at step 829, and store the transmittable, matching file as a local, editable file. Step 830 may include the client device displaying the contents of the local, editable file in a text editing pane (e.g., text editing pane 624) of the source code editor 802. The contents of the matching file may be modified by way of the GUI of the source code editor 802. Source code editor 802 may receive modifications to the file contents as shown at step 832.

At step 834, the source code editor 802 may receive a command to save the modifications of the local, editable file to the database 808. After receiving such a command, the source code editor 802 may pass the local, editable file as modified to the plugin for transmittal to the computational instance 322. The plugin receives the file as modified at step 836. Using the credentials and addresses from originally retrieving the file from the database, the file as modified is transmitted back to server device 806 at step 838 (e.g., by way of a REST interface possibly formatted similarly to file URL 704). Finally, server device 806 transmits the file as modified to database 808 and it is stored therein at step 840.

In some embodiments, the file name as described above may also include a unique file number, individual file address, or any other file identifier when used to search for and return the specified file as requested.

VII. Plugin Initialization

Figure 9:
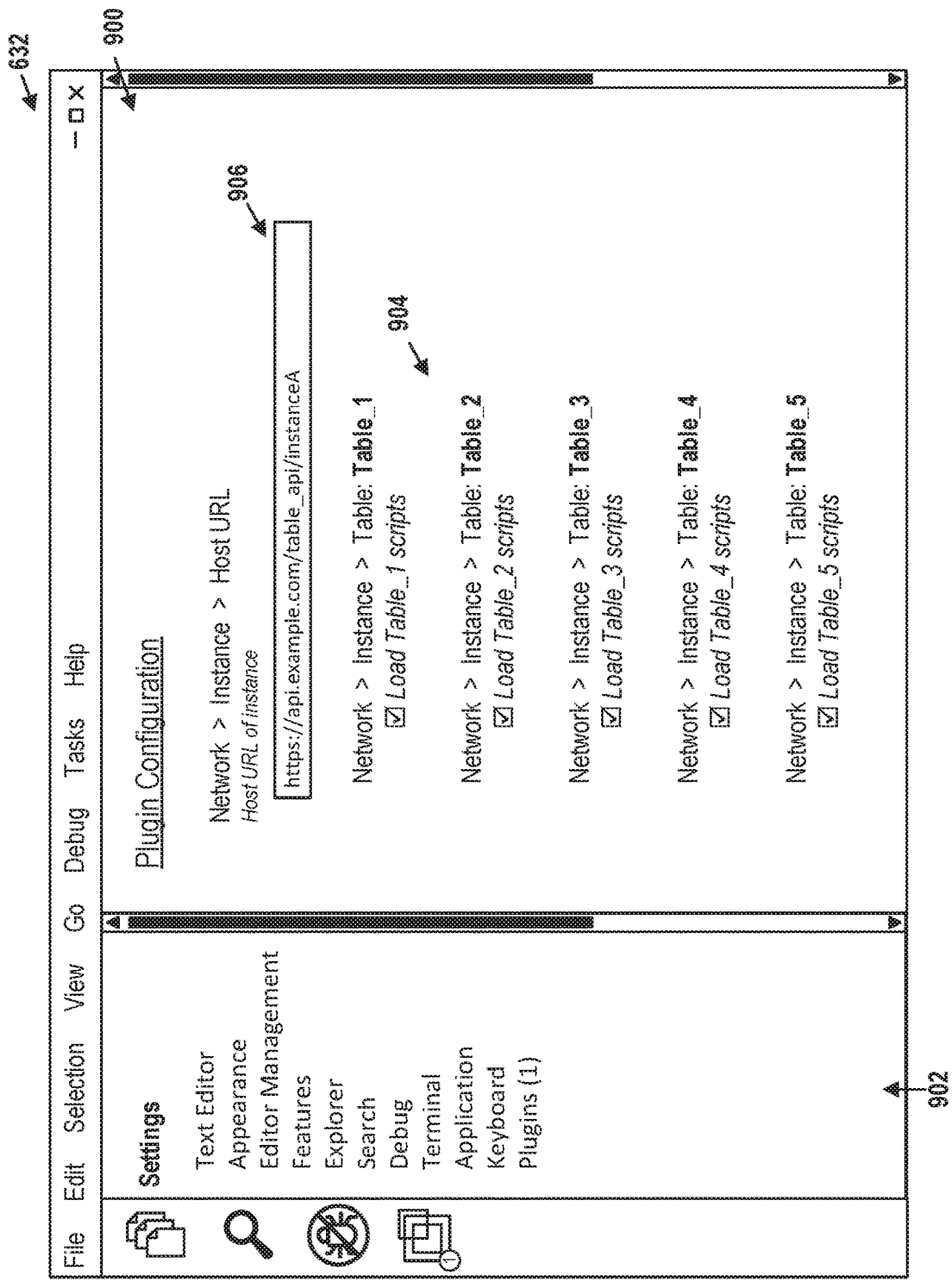
FIG. 9 illustrates a settings pane for an extensible IDE, in accordance with example embodiments.

FIG. 9 depicts an example of an IDE settings pane 900 that may be used to setup or further configure an extensible native IDE, such as plugin-activated native IDE 632. FIG. 9 further depicts an example of a plugin configuration pane 902 that may be used to setup or further configure plugin 804.

In some embodiments, a plugin-activated native IDE may display plugin configuration pane 900. This pane may include URL bar 906, in which a user can enter an address of a computational instance (e.g., computational instance 322). URL bar 902 may pass the submitted address to plugin 804, which, in turn, may generate a request and ultimately transmit said request by way of a URL.

In response, plugin configuration page 900 may also display a list of names representative of the data tables stored within the corresponding computational instance. These may be used to populate table representations 904. In some embodiments, table representations 904 may display interactive graphical elements, such as a radio button or check box that controls whether associated scripts are loaded.

VIII. Example Operations

Figure 10:
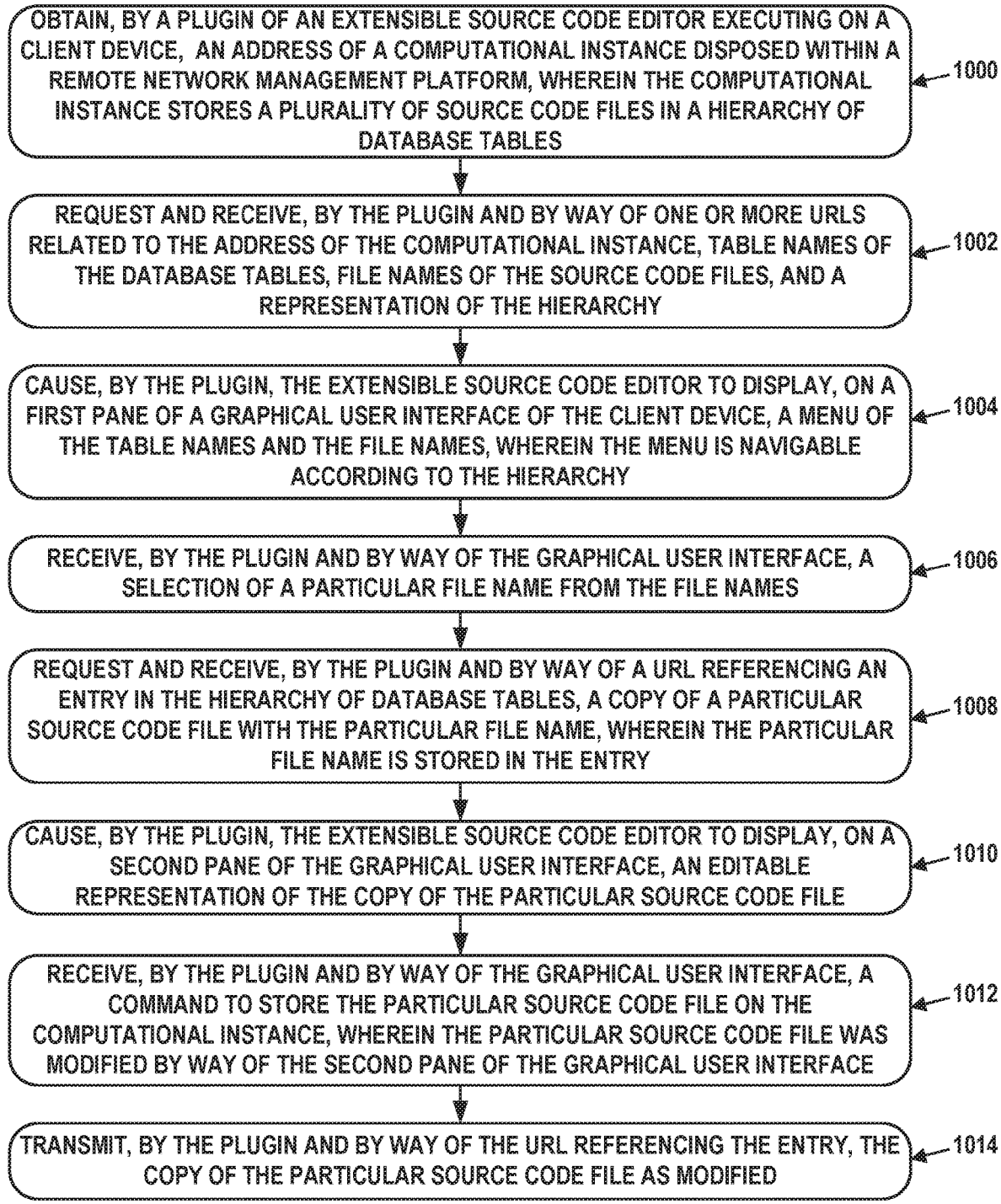
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve obtaining, by a plugin of an extensible source code editor executing on a client device, an address of a computational instance disposed within a remote network management platform, where the computational instance stores a plurality of source code files in a hierarchy of database tables. In some embodiments, the hierarchy is a tree.

Block 1002 may involve requesting and receiving, by the plugin and by way of one or more URLs related to the address of the computational instance, table names of the database tables, file names of the source code files, and a representation of the hierarchy.

Block 1004 may involve causing, by the plugin, the extensible source code editor to display, on a first pane of a graphical user interface of the client device, a menu of the table names and the file names, where the menu is navigable according to the hierarchy.

Block 1006 may involve receiving, by the plugin and by way of the graphical user interface, a selection of a particular file name from the file names.

Block 1008 may involve, possibly in response to receiving the selection, requesting and receiving, by the plugin and by way of a URL referencing an entry in the hierarchy of database tables, a copy of a particular source code file with the particular file name, where the particular file name is stored in the entry.

Block 1010 may involve causing, by the plugin, the extensible source code editor to display, on a second pane of the graphical user interface, an editable representation of the copy of the particular source code file.

Block 1012 may involve receiving, by the plugin and way of the graphical user interface, a command to store the particular source code file on the computational instance, where the particular source code file was modified by way of the second pane of the graphical user interface.

Block 1014 may involve, possibly in response to receiving the command, transmitting, by the plugin and by way of the URL referencing the entry, the copy of the particular source code file as modified.

In some embodiments, obtaining the address of the computational instance includes the extensible source code editor receiving the address of the computational instance by way of the graphical user interface.

In some embodiments, the one or more URLs related to the address of the computational instance and the URL referencing the entry are REST interfaces that include the address and one of the table names.

In some embodiments, the plugin is further configured to: (i) receive, by way of the graphical user interface, a search string; (ii) look up the search string in the table names or the file names; and (iii) cause the extensible source code editor to display, by way of the graphical user interface, one or more of the table names or the file names that contain the search string.

In some embodiments, a database stores the database tables and the plugin is further configured to: (i) receive, by way of the graphical user interface, a search string; (ii) transmit, to the computational instance, a request to search the database for the search string; (iii) receive, from the computational instance, one or more file names of the plurality of source code files that contain the search string; and (iv) cause the extensible source code editor to display, on the graphical user interface, the one or more file names.

In some embodiments, requesting and receiving the copy of the particular source code file includes: (i) transmitting an HTTP GET request to the computational instance, wherein the HTTP GET request refers to the entry; and (ii) receiving the copy of the particular source code file as a response to the HTTP GET request.

In some embodiments, transmitting the copy of the particular source code file as modified includes transmitting an HTTP POST request to the computational instance, where the HTTP POST request refers to the entry and contains the particular source code file as modified.

In some embodiments, displaying, on the second pane of the graphical user interface, the editable representation of the copy of the particular source code file includes: (i) displaying the editable representation with syntax highlighting customized to a language of the particular source code file; and (ii) receiving modifications to the copy of the particular source code file by way of the second pane of the graphical user interface.

IX. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
a memory and a processor, the memory storing instructions that, when executed by the processor, causes the computing system to:
obtain an address of a computational instance in a cloud computing environment disposed within a remote network management platform, wherein the computational instance in the cloud computing environment stores a plurality of source code files in a hierarchy of database tables;
request and receive, via a plugin executing on a client device and by way of one or more uniform resource locators (URLs) related to the address of the computational instance in the cloud computing environment, table names of the database tables, file names of the source code files, and a representation of the hierarchy of database tables;
cause a native extensible source code editor executing on the client device to display, on a first pane of a graphical user interface of the client device, a menu of the table names and the file names, wherein the menu is navigable according to the hierarchy of database tables, and wherein the native extensible source code editor enables bracket matching in the graphical user interface;
receive, by way of the graphical user interface, a selection of a particular file name from the file names;
in response to receiving the selection, request and receive, via the plugin and by way of a URL referencing an entry in the hierarchy of database tables, a copy of a particular source code file with the particular file name, wherein the particular file name is stored in the entry;
transmit, from the plugin to the native extensible source code editor, the copy of the particular source code file with the particular file name;
cause the native extensible source code editor to display, on a second pane of the graphical user interface, the copy of the particular source code file;
receive, by way of the graphical user interface, a command to store the particular source code file on the computational instance in the cloud computing environment, wherein the particular source code file was modified by way of the second pane of the graphical user interface;
in response to receiving the command, transmit, from the native extensible source code editor to the plugin, the copy of the particular source code file as modified; and
transmit, via the plugin and by way of the URL referencing the entry, the copy of the particular source code file as modified and one or more credentials for accessing the particular source code file, to the computational instance in the cloud computing environment.

2. The computing system of claim 1, wherein obtaining the address of the computational instance in the cloud computing environment comprises the native extensible source code editor receiving the address of the computational instance in the cloud computing environment by way of the graphical user interface.

3. The computing system of claim 1, wherein the one or more URLs related to the address of the computational instance in the cloud computing environment and the URL referencing the entry are representational state transfer (REST) interfaces that include the address and one of the table names.

4. The computing system of claim 1, wherein a database stores the database tables, and wherein the instructions cause the computing system to:
   receive, by way of the graphical user interface, a search string;
   transmit, via the plugin and to the computational instance in the cloud computing environment, a request to search the database for the search string;
   receive, from the computational instance, one or more file names of the plurality of source code files that contain the search string;
   transmit, from the plugin to the native extensible source code editor, the one or more file names of the plurality of source code files that contain the search string and
   cause the native extensible source code editor to display, on the graphical user interface, the one or more file names.

5. The computing system of claim 1, wherein requesting and receiving the copy of the particular source code file comprises:
   transmitting, via the plugin, a hypertext transfer protocol (HTTP) GET request to the computational instance in the cloud computing environment, wherein the HTTP GET request refers to the entry; and
   receiving the copy of the particular source code file as a response to the HTTP GET request.

6. The computing system of claim 1, wherein transmitting the copy of the particular source code file as modified comprises:
   transmitting, via the plugin, a hypertext transfer protocol (HTTP) POST request to the computational instance in the cloud computing environment, wherein the HTTP POST request refers to the entry and contains the particular source code file as modified.

7. The computing system of claim 1, wherein displaying, on the second pane of the graphical user interface, the copy of the particular source code file comprises:
   displaying the copy of the particular source code file with syntax highlighting customized to a language of the particular source code file; and
   receiving modifications to the copy of the particular source code file by way of the second pane of the graphical user interface.

8. A computer-implemented method comprising:
   obtaining, by a plugin of an extensible source code editor executing on a client device, an address of a computational instance in a cloud computing environment disposed within a remote network management platform, wherein the computational instance in the cloud computing environment stores a plurality of source code files in a hierarchy of database tables;
   generating a first uniform resource locator (URL) comprising the address of the computational instance in the cloud computing environment;
   requesting and receiving, by the plugin and by way of the first URL, table names of the database tables, file names of the source code files, and a representation of the hierarchy of database tables;
   causing, by the plugin, the extensible source code editor to display, on a first pane of a graphical user interface of the client device, a menu of the table names and the file names, wherein the menu is navigable according to the hierarchy of database tables;
   receiving, by the plugin and by way of the graphical user interface, a selection of a particular file name from the file names, wherein the particular file name belongs to a particular source code file stored in a particular table having a particular table name;
   generating a second URL comprising the address of the computational instance, the particular table name, and the particular file name;
   in response to receiving the selection, requesting and receiving, by the plugin and by way of the second URL, a copy of the particular source code file with the particular file name;
   transmitting, from the plugin to the extensible source code editor, the copy of the particular source code file with the particular file name;
   causing, by the plugin, the extensible source code editor to display, on a second pane of the graphical user interface, of the copy of the particular source code file;
   receiving, by the plugin and by way of the graphical user interface, a command to store the particular source code file on the computational instance in the cloud computing environment, wherein the particular source code file was modified by way of the second pane of the graphical user interface;
   in response to receiving the command, transmitting, from the extensible source code editor to the plugin, the copy of the particular source code file as modified; and
   transmit, by the plugin and by way of the second URL, the copy of the particular source code file as modified and one or more credentials for accessing the particular source code file to the computational instance in the cloud computing environment.

9. The computer-implemented method of claim 8, wherein the first URL and the second URL are representational state transfer (REST) interfaces that include the address and one of the table names.

10. The computer-implemented method of claim 8, further comprising:
    receiving, by the plugin and by way of the graphical user interface, a search string;
    looking up, by the plugin, the search string in the table names or the file names; and
    causing, by the plugin, the extensible source code editor to display, by way of the graphical user interface, one or more of the table names or the file names that contain the search string.

11. The computer-implemented method of claim 8, wherein a database stores the database tables, the method further comprising:
    receiving, by the plugin and by way of the graphical user interface, a search string;
    transmitting, by the plugin and to the computational instance in the cloud computing environment, a request to search the database for the search string;
    receiving, by the plugin and from the computational instance, one or more file names of the plurality of source code files that contain the search string; and
    causing, by the plugin, the extensible source code editor to display, on the graphical user interface, the one or more file names.

12. The computer-implemented method of claim 8, wherein requesting and receiving the copy of the particular source code file comprises:
    transmitting, by the plugin, a hypertext transfer protocol (HTTP) GET request to the computational instance in the cloud computing environment; and receiving, by the plugin, the copy of the particular source code file as a response to the HTTP GET request.

13. The computer-implemented method of claim 8, wherein transmitting the copy of the particular source code file as modified comprises:
transmitting, by the plugin, a hypertext transfer protocol (HTTP) POST request to the computational instance in the cloud computing environment, wherein the HTTP POST request contains the particular source code file as modified.

14. The computer-implemented method of claim 8, wherein displaying, on the second pane of the graphical user interface, the copy of the particular source code file comprises:
displaying, by the plugin, the copy of the particular source code file with syntax highlighting customized to a language of the particular source code file; and
receiving, by the plugin, modifications to the copy of the particular source code file by way of the second pane of the graphical user interface.

15. An article of manufacture including a non-transitory computer-readable medium, having stored thereon program instructions that, upon execution, cause a computing device to perform operations comprising:
obtaining, by a plugin executing on a client device, an address of a computational instance in a cloud computing environment disposed within a remote network management platform, wherein the computational instance in the cloud computing environment stores a plurality of source code files in a hierarchy of database tables;
requesting and receiving, by the plugin and by way of one or more uniform resource locators (URLs) related to the address of the computational instance in the cloud computing environment, table names of the database tables, file names of the source code files, and a representation of the hierarchy of database tables;
causing, by the plugin, a native extensible source code editor executing on the client device to display, on a first pane of a graphical user interface of a computing device, a menu of the table names and the file names, wherein the menu is navigable according to the hierarchy of database tables, wherein the native extensible source code editor enables collapsible code in the graphical user interface;
receiving, by the plugin and by way of the graphical user interface, a selection of a particular file name from the file names;
in response to receiving the selection, requesting and receiving, by the plugin and by way of a URL referencing an entry in the hierarchy of database tables, a copy of a particular source code file with the particular file name, wherein the particular file name is stored in the entry;
transmitting, from the plugin to the native extensible source code editor, the copy of the particular source code file with the particular file name;
causing, by the plugin, the native extensible source code editor to display, on a second pane of the graphical user interface, the copy of the particular source code file;
receiving, by the plugin and by way of the graphical user interface, a command to store the particular source code file on the computational instance in the cloud computing environment, wherein the particular source code file was modified by way of the second pane of the graphical user interface;
in response to receiving the command, transmitting, from the native extensible source code editor to the plugin, the copy of the particular source code file as modified; and
transmitting, by the plugin and by way of the URL referencing the entry, the copy of the particular source code file as modified to the computational instance in the cloud computing environment.

16. The article of manufacture of claim 15, wherein one or more URLs related to the address of the computational instance in the cloud computing environment and the URL referencing the entry are representational state transfer (REST) interfaces that include the address and one of the table names.

17. The article of manufacture of claim 15, the operations further comprising:
receiving, by the plugin and by way of the graphical user interface, a search string;
looking up, by the plugin, the search string in the table names or the file names; and
causing, by the plugin, the native extensible source code editor to display, by way of the graphical user interface, one or more of the table names or the file names that contain the search string.

18. The article of manufacture of claim 15, wherein a database stores the database tables, the operations further comprising:
receiving, by the plugin and by way of the graphical user interface, a search string;
transmitting, by the plugin and to the computational instance in the cloud computing environment, a request to search the database for the search string;
receiving, by the plugin and from the computational instance, one or more file names of the plurality of source code files that contain the search string; and
causing, by the plugin, the native extensible source code editor to display, on the graphical user interface, the one or more file names.

19. The computing system of claim 1, wherein the URL referencing the entry comprises an instance ID field including an instance ID that references the computational instance in the cloud computing environment.

20. The computing system of claim 1, wherein the native extensible source code editor enables syntax highlighting, collapsible code, auto-indentation, and box-selection in the graphical user interface.

* * * * *